(12) United States Patent  
Kitagawa et al.

(10) Patent No.: US 10,663,593 B2  
(45) Date of Patent: May 26, 2020

(54) PROJECTOR APPARATUS WITH DISTANCE IMAGE ACQUISITION DEVICE AND PROJECTION METHOD

(71) Applicant: FUJIFILM Corporation, Tokyo (JP)

(72) Inventors: Junya Kitagawa, Saitama (JP); Tomoyuki Kawai, Saitama (JP); Yasuhiro Shinkai, Saitama (JP); Tomonori Masuda, Saitama (JP); Yoshinori Furuta, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 165 days.

(21) Appl. No.: 15/925,087

(22) Filed: Mar. 19, 2018

(65) Prior Publication Data  
US 2018/0224553 A1 Aug. 9, 2018

Related U.S. Application Data

(63) Continuation of application No. PCT/JP2016/074251, filed on Aug. 19, 2016.

(30) Foreign Application Priority Data

Sep. 29, 2015 (JP) ................. 2015-191761

(51) Int. Cl.  
*G01C 3/08* (2006.01)  
*G01S 17/89* (2020.01)  
(Continued)

(52) U.S. Cl.  
CPC ............ *G01S 17/89* (2013.01); *G01S 7/4863* (2013.01); *G01S 17/50* (2013.01); *G01S 17/87* (2013.01);  
(Continued)

(58) Field of Classification Search  
None  
See application file for complete search history.

(56) References Cited

U.S. PATENT DOCUMENTS

| 6,434,255 | B1 * | 8/2002 | Harakawa | ............. G06F 3/0304 382/103 |
| 2003/0085834 | A1 * | 5/2003 | Okamura | ............. G01S 7/2923 342/70 |

(Continued)

FOREIGN PATENT DOCUMENTS

| JP | 7-112663 A | 5/1995 |
| JP | 2003-255219 A | 9/2003 |

(Continued)

OTHER PUBLICATIONS

International Preliminary Report on Patentability and Written Opinion of the International Searching Authority(Forms PCT/IB/326, PCT/IB/373 and PCT/ISA/237), dated Apr. 12, 2018, for International Application No. PCT/JP2016/074251, with an English Translation of the Written Opinion.

International Search Report (form PCT/ISA/210) for International Application No. PCT/JP2016/074251, dated Nov. 22, 2016, with English Translation.

*Primary Examiner* — Isam A Alsomiri  
*Assistant Examiner* — Amir J Askarian  
(74) *Attorney, Agent, or Firm* — Birch, Stewart, Kolasch & Birch, LLP

(57) ABSTRACT

In an aspect of the invention, a projector apparatus (20) with a distance image acquisition device includes a projection image generation unit (28), a difference value acquisition unit (101) that acquires a difference value between distance information of a first distance image acquired at a first timing and distance information of a second distance image acquired at a second timing, a determination unit (103) that determines whether the body to be projected is at a standstill on the basis of the difference value acquired by the difference value acquisition unit (101), a projection instruction (Continued)

unit (105) that outputs a command to project an image generated by the projection image generation unit (28) to the body to be projected, and a projection control unit (107) that controls a projection operation of the projector apparatus (20) on the basis of the projection command output from the projection instruction unit (105).

17 Claims, 13 Drawing Sheets

(51) Int. Cl.
  *H04N 9/31* (2006.01)
  *G03B 21/53* (2006.01)
  *G03B 21/14* (2006.01)
  *G01S 7/4863* (2020.01)
  *G01S 17/50* (2006.01)
  *G01S 17/87* (2020.01)
  *G03B 21/00* (2006.01)
  *G03B 21/20* (2006.01)

(52) U.S. Cl.
  CPC ........... *G03B 21/142* (2013.01); *G03B 21/53* (2013.01); *H04N 9/317* (2013.01); *H04N 9/3185* (2013.01); *H04N 9/3194* (2013.01); *G03B 21/006* (2013.01); *G03B 21/14* (2013.01); *G03B 21/2053* (2013.01)

(56) References Cited

U.S. PATENT DOCUMENTS

| | | | |
|---|---|---|---|
| 2012/0075534 A1* | 3/2012 | Katz | H04N 9/3182 348/602 |
| 2013/0265232 A1* | 10/2013 | Yun | G09G 3/3208 345/158 |
| 2015/0022726 A1* | 1/2015 | Kojima | H04N 9/3185 348/745 |
| 2015/0077534 A1* | 3/2015 | Derenne | G16H 40/63 348/77 |
| 2015/0103174 A1* | 4/2015 | Emura | B60R 1/00 348/148 |
| 2015/0206292 A1* | 7/2015 | Masuko | H04N 9/3185 705/27.2 |
| 2016/0188123 A1* | 6/2016 | Fujiune | G03B 21/145 345/156 |
| 2016/0286186 A1* | 9/2016 | Fujiune | G09G 5/00 |

FOREIGN PATENT DOCUMENTS

| | | |
|---|---|---|
| JP | 2013-192189 A | 9/2013 |
| JP | 2013-546222 A | 12/2013 |
| JP | 2014-41225 A | 3/2014 |
| JP | 2015-38595 A | 2/2015 |
| JP | 2015-518580 A | 7/2015 |
| WO | WO 2014/034188 A | 3/2014 |

* cited by examiner

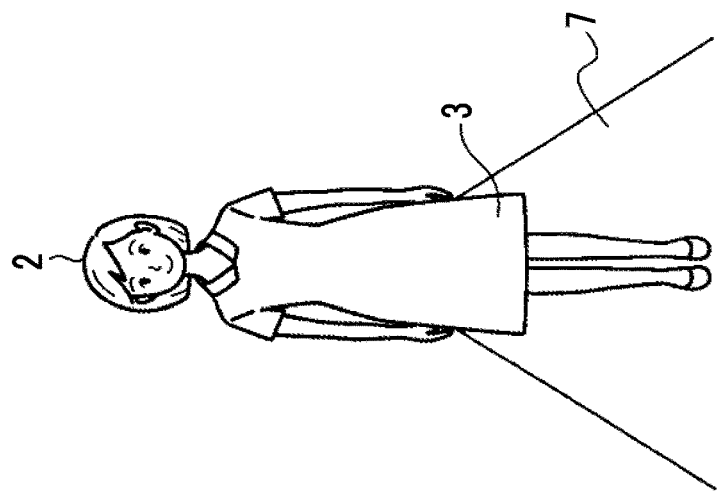
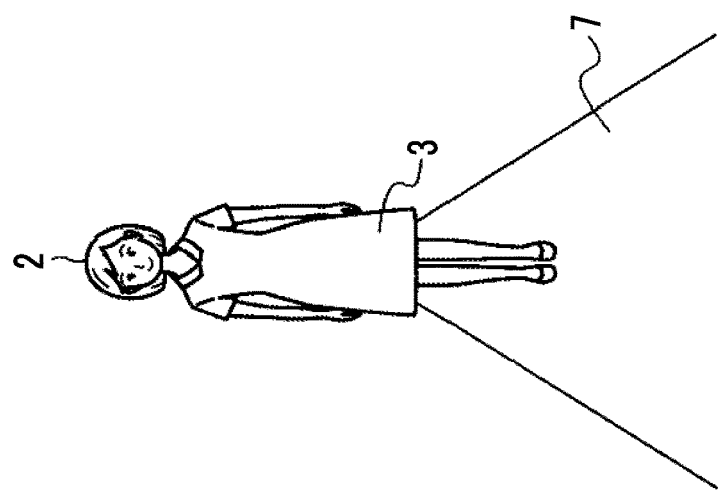
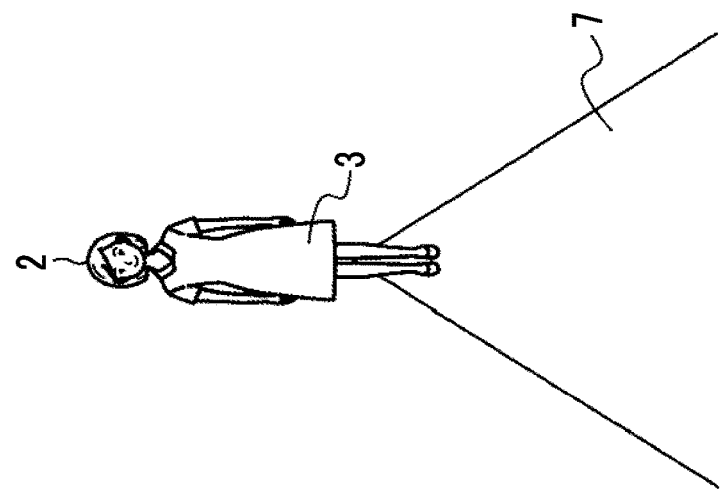

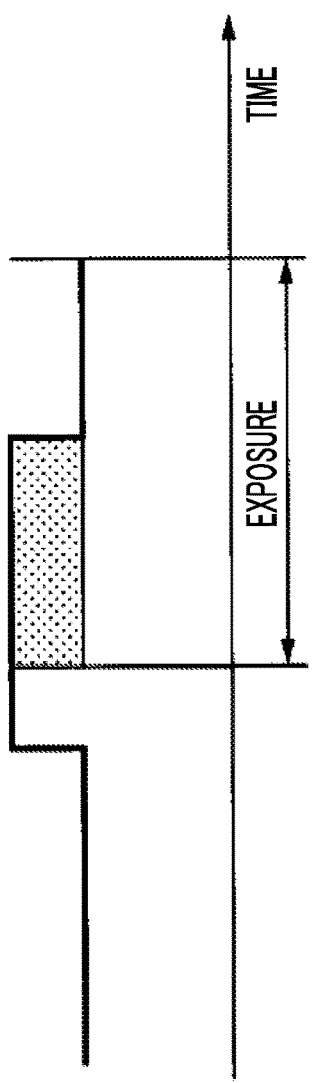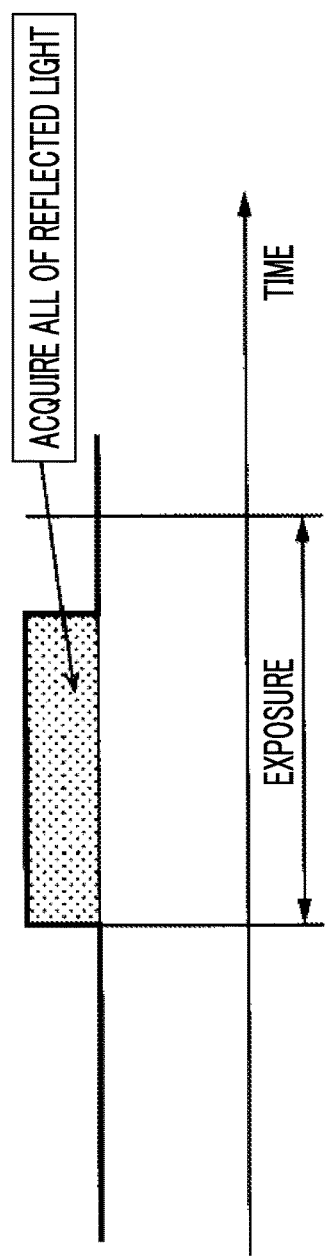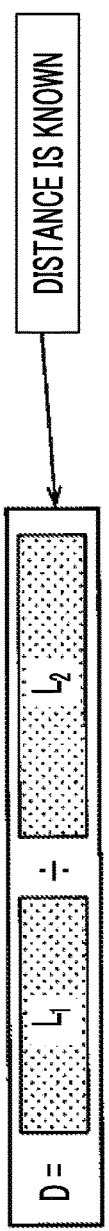
FIG. 5A FIRST EXPOSURE CONTROL
FIG. 5B SECOND EXPOSURE CONTROL
FIG. 5C CALCULATION PROCESS

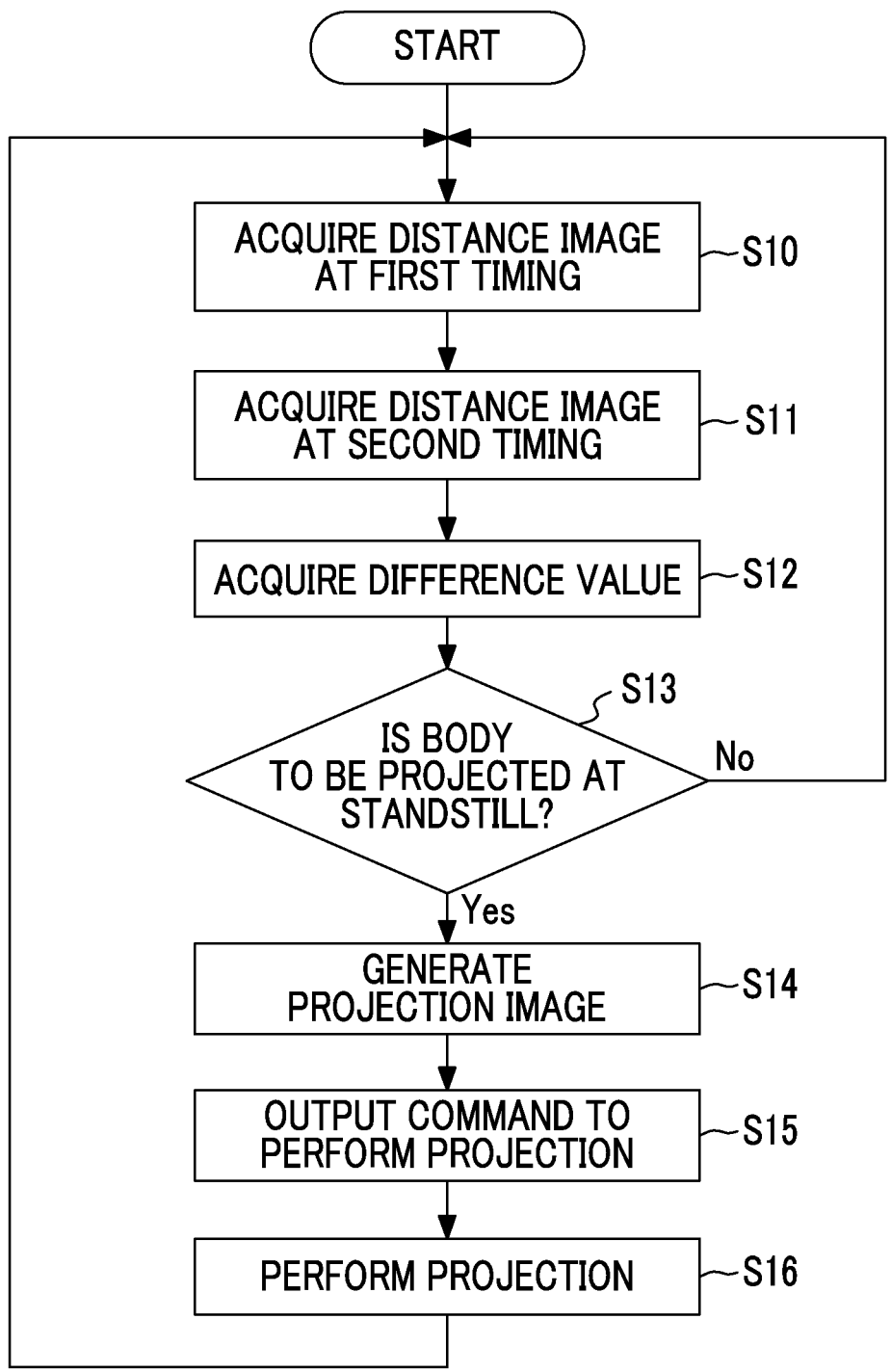

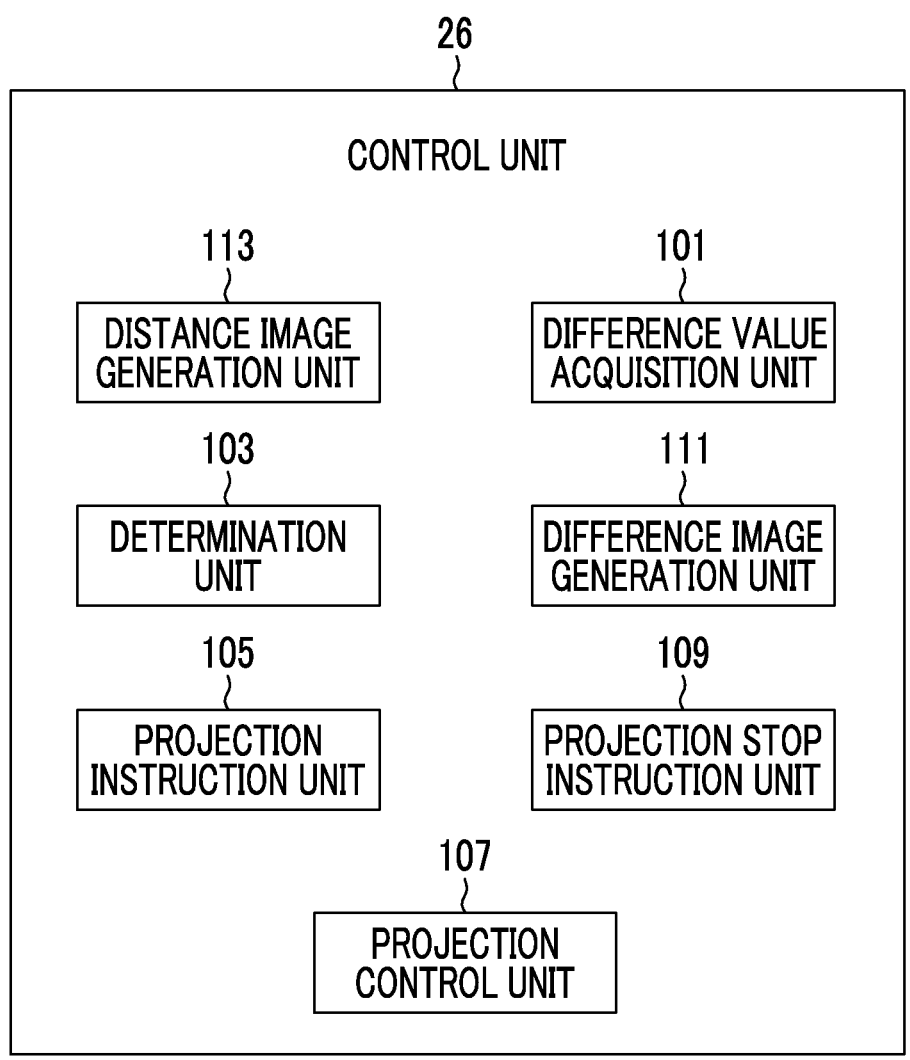

PROJECTOR APPARATUS WITH DISTANCE IMAGE ACQUISITION DEVICE AND PROJECTION METHOD

CROSS-REFERENCE TO RELATED APPLICATIONS

The present application is a Continuation of PCT International Application No. PCT/JP2016/074251 filed on Aug. 19, 2016 claiming priority under 35 U.S.C § 119(a) to Japanese Patent Application No. 2015-191761 filed on Sep. 29, 2015. Each of the above applications is hereby expressly incorporated by reference, in their entirety, into the present application.

BACKGROUND OF THE INVENTION

1. Field of the Invention

The present invention relates to a projector apparatus with a distance image acquisition device and a projection method, and more particularly, to a technique that projects an image according to the movement of a body to be projected that is moving or is at a standstill.

2. Description of the Related Art

A time-of-flight (TOF) camera has been known as a camera that acquires an image while acquiring distance information. The TOF camera measures the time (time of flight) until light is emitted to an object and reflected light is received by an image sensor to calculate a distance image (depth data) indicating the distance to the object.

In addition, a technique has been known in which a projector apparatus projects an image according to the three-dimensional shape of a body to be projected and is referred to as, for example, projection mapping or video mapping.

JP2013-192189A discloses a technique that transforms a captured image of a body to be projected from a coordinate system of an electronic camera to a coordinate system of a display screen, performs edge processing for the body to be projected in the transformed image to extract a contour shape of a closed region, and performs projection mapping for the contour shape.

Furthermore, JP2013-546222A discloses a technique in which a TOF camera is used as a device for acquiring a distance image of a body to be projected in real time and is integrated with a projector apparatus to reduce the size of a projection mapping apparatus.

In particular, the projector apparatus disclosed in JP2013-546222A is characterized in that the projector apparatus emits an image for projection as pulsed light and a light source and a projection lens of the projector apparatus function as a light source and a projection lens of the TOF camera.

SUMMARY OF THE INVENTION

Here, in the projection mapping, since an image generated according to the shape of the body to be projected is projected, it is important to detect whether the body to be projected is moving or is at a standstill. That is, in a case in which projection mapping is performed for the body to be projected that is moving, the deviation between the body to be projected and a projection image occurs. As a result, in some cases, it is difficult to appropriately perform projection mapping.

In order to detect the movement of the body to be projected, the function of a detection device for detecting the movement of the body to be projected needs to be added to the projector apparatus, which causes an increase in the size of the projector apparatus or the complication of the projector apparatus.

JP2013-192189A and JP2013-546222A do not disclose the technique that prevents an increase in the size of the projector apparatus or the complication of the projector apparatus and detects the movement of the body to be projected in a case in which projection mapping is performed.

The invention has been made in view of the above-mentioned problems and an object of the invention is to provide a projector apparatus with a distance image acquisition device and a projection method that prevent an increase in the size of the projector apparatus or prevent the projector apparatus from being complicated, detect the movement of a body to be projected, and project an image to the body to be projected with high accuracy.

In order to achieve the object, an aspect of the invention provides a projector apparatus with a distance image acquisition device including: a projector device including a display optical element that displays a projection image and a projection light source and a projection lens that project the projection image displayed on the display optical element to a body to be projected; and a distance image acquisition device including a distance image sensor in which a plurality of light receiving elements are two-dimensionally arranged, a measurement light source, a focus lens that focuses measurement light which is emitted from the measurement light source and is reflected from the body to be projected on the distance image sensor, and a distance image generation unit that acquires, from the distance image sensor, distance information corresponding to a time of flight of the measurement light which is emitted from the measurement light source, is reflected from the body to be projected, and is incident on the distance image sensor and generates a distance image on the basis of the acquired distance information. The projector device includes: a projection image generation unit that detects a shape of the body to be projected, on the basis of the distance image acquired by the distance image acquisition device, and generates a projection image corresponding to the detected shape; a difference value acquisition unit that acquires a difference value between distance information of a first distance image which is acquired by the distance image acquisition device at a first timing and distance information of a second distance image which is acquired by the distance image acquisition device at a second timing; a determination unit that determines whether the body to be projected is at a standstill on the basis of the difference value acquired by the difference value acquisition unit; a projection instruction unit that outputs a command to project an image generated by the projection image generation unit to the body to be projected, on the basis of a determination result of the determination unit; and a projection control unit that controls a projection operation of the projector device on the basis of the projection command output from the projection instruction unit.

According to this aspect, the shape of the body to be projected is detected on the basis of the distance image generated by the distance image generation unit of the distance image acquisition device and the projection image is generated. In addition, according to this aspect, it is determined whether the body to be projected is at a standstill on the basis of the difference value between the distance image acquired at the first timing and the distance image acquired at the second timing and projection is performed on the basis of the determination result. In this aspect, the distance image is used to generate the projection image and is used to determine whether the body to be projected is at a standstill. Therefore, it is possible to prevent an increase in the size of the apparatus or to prevent the apparatus from being complicated. In addition, it is possible to detect the movement of the body to be projected. As a result, it is possible to project the projection image to the body to be projected with high accuracy.

Preferably, the difference value acquisition unit acquires a difference value between an average value of the distance information of the first distance image and an average value of the distance information of the second distance image. Preferably, in a case in which the difference value is equal to or less than a first threshold value, the determination unit determines that the body to be projected is at a standstill.

According to this aspect, the difference value is calculated on the basis of the average value of the distance information of the first distance image and the average value of the distance information of the second distance image and the determination unit determines whether the body to be projected is at a standstill on the basis of the first threshold value. Therefore, in this aspect, it is possible to determine whether the body to be projected is at a standstill with high accuracy, on the basis of the average values of the distance information of the distance images.

Preferably, the difference value acquisition unit acquires a maximum difference value between the distance information of the first distance image and the distance information of the second distance image. Preferably, in a case in which the maximum difference value is equal to or less than a second threshold value, the determination unit determines that the body to be projected is at a standstill.

According to this aspect, the difference value is the maximum value of the difference value between the distance information of the first distance image and the distance information of the second distance image and the determination unit determines whether the body to be projected is at a standstill on the basis of the second threshold value. Therefore, in this aspect, it is possible to determine whether the body to be projected is at a standstill with high accuracy, on the basis of the maximum value of the difference value.

Preferably, the projector apparatus with a distance image acquisition device further includes a difference image generation unit that generates a difference image on the basis of the difference value acquired by the difference value acquisition unit.

According to this aspect, the difference image is generated on the basis of the difference value. Therefore, it is possible to use the difference image.

Preferably, the difference image generation unit acquires an average difference value of a plurality of frames of the difference images. Preferably, in a case in which the average difference value of the plurality of frames of the difference images is equal to or less than a third threshold value, the determination unit determines that the body to be projected is at a standstill.

According to this aspect, in a case in which the average difference value of the plurality of frames of the difference images is equal to or less than the third threshold value, it is determined that the body to be projected is at a standstill. Therefore, it is possible to determine whether the body to be projected is at a standstill with high accuracy.

Preferably, the difference image generation unit acquires a maximum difference value of a plurality of frames of the difference images. Preferably, in a case in which the maximum difference value of the plurality of frames of the difference images is equal to or less than a fourth threshold value, the determination unit determines that the body to be projected is at a standstill.

According to this aspect, in a case in which the maximum difference value of the plurality of frames of the difference images is equal to or less than the fourth threshold value, the determination unit determines that the body to be projected is at a standstill. Therefore, it is possible to determine whether the body to be projected is at a standstill on the basis of the maximum difference value in a plurality of frames.

Preferably, the difference image generation unit acquires a difference value of each region of the difference image and the determination unit determines whether the body to be projected is at a standstill on the basis of a size of the region in which the difference value is equal to or less than a fifth threshold value in the difference image.

According to this aspect, it is determined whether the body to be projected is at a standstill on the basis of the size of the region in which the difference value is equal to or less than the fifth threshold value in the difference image. Therefore, it is possible to determine whether the body to be projected is at a standstill with high accuracy.

Preferably, the difference image generation unit acquires a difference value of each region of the difference images in a plurality of frames and the determination unit determines whether the body to be projected is at a standstill on the basis of a size of a region in which the difference value is equal to or less than a sixth threshold value in the difference images in the plurality of frames.

According to this aspect, it is determined whether the body to be projected is at a standstill on the basis of the size of the region in which the difference value is equal to or less than the sixth threshold value in the difference images in the plurality of frames. Therefore, it is possible to determine whether the body to be projected is at a standstill with high accuracy in a plurality of frames.

Preferably, the difference image generation unit acquires a value obtained by multiplying a weighting coefficient which is set according to a region of the difference image by the difference value. Preferably, in a case in which the value obtained by multiplying the weighting coefficient by the difference value is equal to or less than a seventh threshold value, the determination unit determines that the body to be projected is at a standstill.

According to this aspect, the difference value is acquired on the basis of the weight that is set according to the region of the difference image and it is determined whether the body to be projected is at a standstill on the basis of the difference value. Therefore, it is possible to determine the movement of the body to be projected with high accuracy.

Preferably, the projector apparatus with a distance image acquisition device further includes a projection stop instruction unit that outputs a stop command to stop the projection of the image generated by the projection image generation unit to the body to be projected, on the basis of the determination result of the determination unit. Preferably, the projection control unit controls the projection operation of the projector apparatus on the basis of the projection stop command from the projection stop instruction unit.

According to this aspect, the image projection stop command is output on the basis of the determination result and the projection operation of the projector apparatus is controlled on the basis of the stop command. Therefore, in a case in which the body to be projected that is at a standstill starts to move, it is possible to stop the projection. As a result, it is possible to prevent an image from being projected to the body to be projected that is moving and to perform projection with high accuracy.

According to another aspect of the invention, there is provided a projection method using a projector apparatus with a distance image acquisition device that includes a projector device including a display optical element that displays a projection image and a projection light source and a projection lens that project the projection image displayed on the display optical element to a body to be projected and a distance image acquisition device including a distance image sensor in which a plurality of light receiving elements are two-dimensionally arranged, a measurement light source, a focus lens that focuses measurement light which is emitted from the measurement light source and is reflected from the body to be projected on the distance image sensor, and a distance image generation unit that acquires, from the distance image sensor, distance information corresponding to a time of flight of the measurement light which is emitted from the measurement light source, is reflected from the body to be projected, and is incident on the distance image sensor and generates a distance image on the basis of the acquired distance information. The projection method includes: a projection image generation step of detecting a shape of the body to be projected, on the basis of the distance image acquired by the distance image acquisition device, and generating a projection image corresponding to the detected shape; a difference value acquisition step of acquiring a difference value between distance information of a first distance image which is acquired by the distance image acquisition device at a first timing and distance information of a second distance image which is acquired by the distance image acquisition device at a second timing; a determination step of determining whether the body to be projected is at a standstill on the basis of the difference value acquired in the difference value acquisition step; a projection instruction step of outputting a command to project an image generated in the projection image generation step to the body to be projected, on the basis of a determination result in the determination step; and a projection control step of controlling a projection operation of the projector device on the basis of the projection command output in the projection instruction step.

According to the invention, the shape of a body to be projected is detected on the basis of the distance image generated by the distance image generation unit of the distance image acquisition device and the projection image is generated. It is determined whether the body to be projected is at a standstill on the basis of the difference value between the distance image acquired at the first timing and the distance image acquired at the second timing and projection is performed on the basis of the determination result. In the invention, the distance image is used to generate a projection image and is used to determine whether the body to be projected is at a standstill. Therefore, it is possible to prevent an increase in the size of the apparatus or to prevent the apparatus from being complicated. In addition, it is possible to detect the movement of the body to be projected. As a result, it is possible to project a projection image to the body to be projected with high accuracy.

BRIEF DESCRIPTION OF THE DRAWINGS

FIG. 2A to FIG. 2C are diagrams illustrating a body to be projected illustrated in FIG. 1 as viewed from the front side.

FIG. 5A to FIG. 5C are diagrams illustrating a process of calculating the distance to the body to be projected.

FIG. 9 is a flowchart illustrating the operation of the projector apparatus.

FIG. 10 is a block diagram illustrating the configuration of a control unit.

DESCRIPTION OF THE PREFERRED EMBODIMENTS

Hereinafter, preferred embodiments of a projector apparatus with a distance image acquisition device and a projection method according to the invention will be described with reference to the accompanying drawings.

Figure 1:
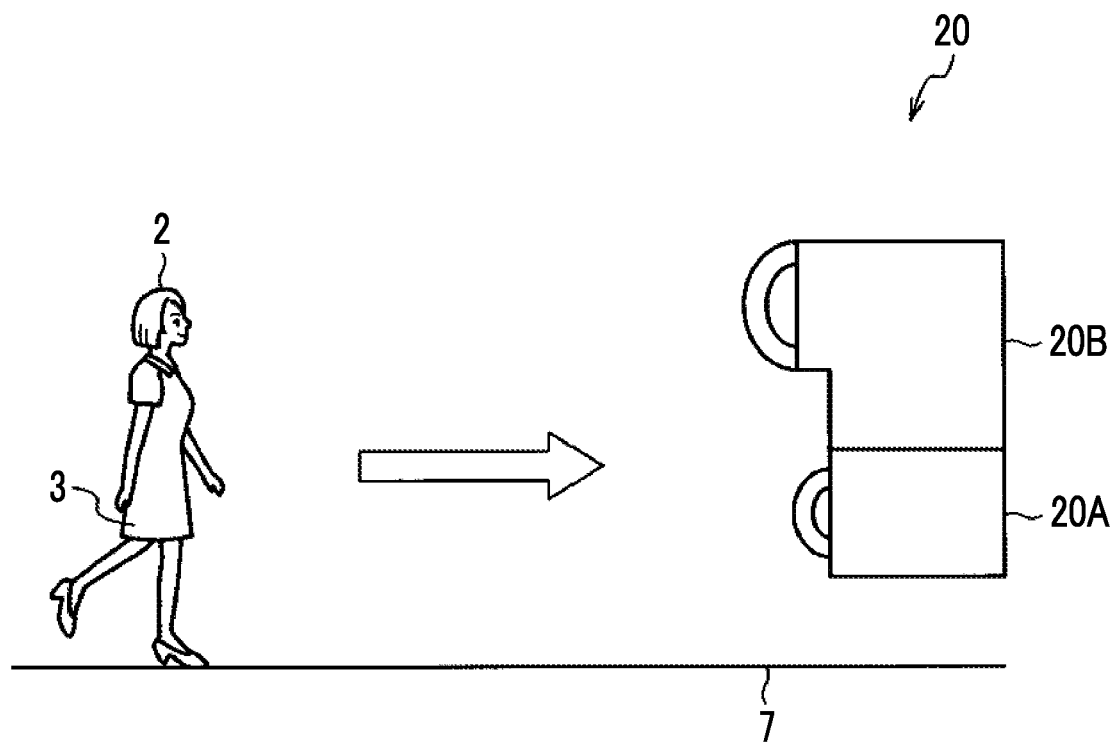
FIG. 1 is a conceptual diagram illustrating a case in which a projector apparatus with a distance image acquisition device is used.

FIG. 1 is a conceptual diagram illustrating a case in which the projector apparatus with a distance image acquisition device according to the invention is used. FIG. 1 illustrates a case in which a person that is a body 2 to be projected goes straight to a projector apparatus 20 with a distance image acquisition device (hereinafter, referred to as a projector apparatus 20). A fashion show is assumed as a specific example of the case illustrated in FIG. 1. The projector apparatus 20 includes a distance image acquisition unit (distance image acquisition device) 20A and a projector unit (projector device) 20B. In a case in which the clothes of a person that is the body 2 to be projected are a projection region 3 and the body 2 to be projected is at a standstill, the projector apparatus 20 performs projection mapping for the projection region 3 of the body 2 to be projected.

FIG. 2 is a diagram illustrating the body 2 to be projected illustrated in FIG. 1 as viewed from the front side. FIG. 2A is a front view illustrating the body 2 to be projected at a time T1, FIG. 2B is a front view illustrating the body 2 to be projected at a time T2, and FIG. 2C is a front view illustrating the body 2 to be projected at a time T3. In a case in which the body 2 to be projected moves as illustrated in FIGS. 2A to 2C, the distance between the projector apparatus 20 and the body 2 to be projected changes. Therefore, the range of the projection region 3 changes. In a case in which the range of the projection region 3 changes, a projection image that is generated according to the projection region 3 is not matched with the projection region 3. For this reason, in the invention, the following process is performed in order to prevent the mismatch between the projection image and the projection region 3: the movement of the body 2 to be projected is detected; and projection mapping is performed in a case in which the body 2 to be projected is at a standstill.

Figure 3:
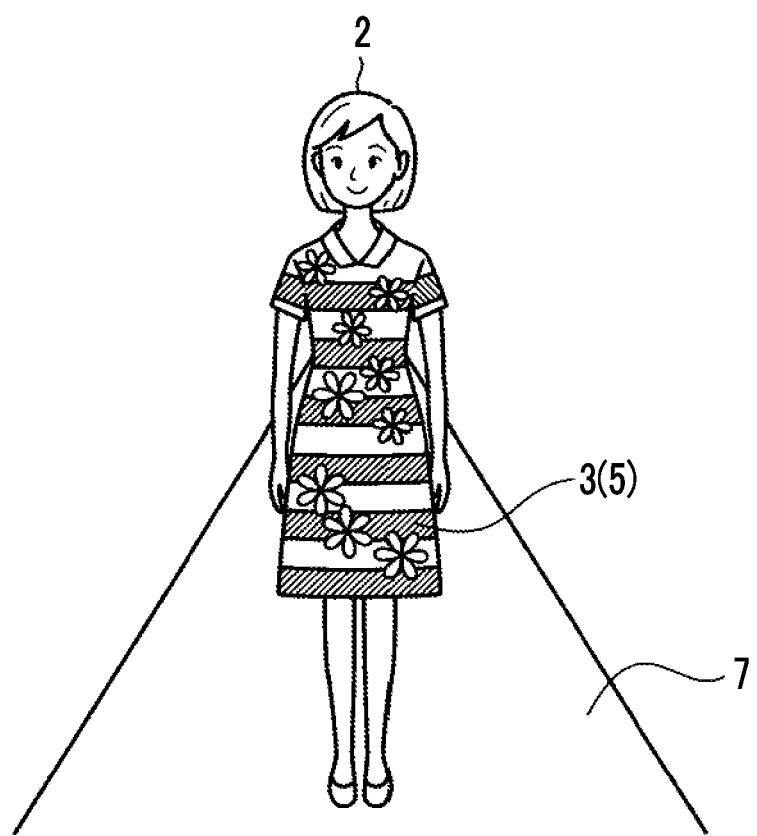
FIG. 3 is a conceptual diagram illustrating an aspect in which projection mapping is performed for the body to be projected illustrated in FIG. 2.

FIG. 3 is a conceptual diagram illustrating an aspect in which projection mapping is performed for the body 2 to be projected illustrated in FIG. 2C. The projector apparatus 20 projects a projection image 5 to the clothes of the person that is the body 2 to be projected. In the projection image 5 projected by the projector apparatus 20, the shape of a closed region formed by the clothes of the person that is the body 2 to be projected is fitted to the projection region 3. As such, the projection of the projection image 5 fitted to the shape of the projection region 3 is generally referred to as projection mapping.

Figure 4:
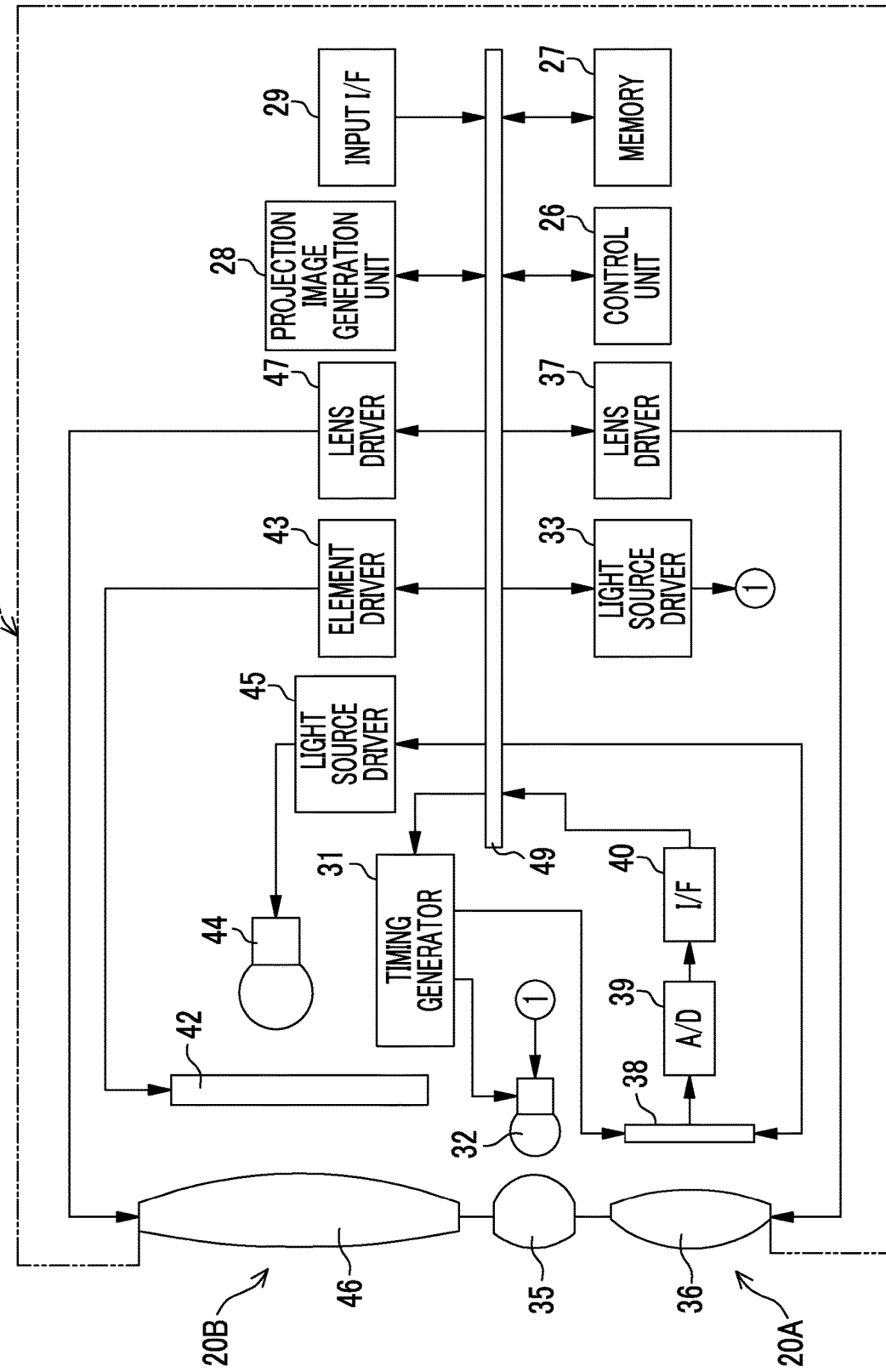
FIG. 4 is a block diagram illustrating the configuration of the projector apparatus.

FIG. 4 is a block diagram illustrating the configuration of the projector apparatus 20. The projector apparatus 20 includes the distance image acquisition unit 20A that acquires a distance image, the projector unit 20B that projects the projection image 5, a control unit 26, a memory 27, a projection image generation unit 28, and an input interface (I/F) 29. The control unit 26, the memory 27, and the input I/F 29 are common to the distance image acquisition unit 20A and the projector unit 20B.

The distance image acquisition unit 20A acquires a distance image using a pulsed light detection method and includes a timing generator 31, a light emitting diode (LED) light source (measurement light source) 32, a light source driver 33, a projection lens 35, a focus lens 36, a lens driver 37, a distance image sensor 38, an analog-to-digital (AD) converter 39 that is represented by "A/D" in FIG. 4, and an interface circuit 40 that is represented by "I/F" in FIG. 4. The distance image acquisition unit 20A has the function of a so-called time-of-flight (TOF) camera. The principle of the time-of-flight (TOF) camera will be described below. The distance image is a two-dimensional distribution image of distance values (distance information) obtained by a distance measurement method such as TOF. Each pixel of the distance image has a distance value (distance information).

The timing generator 31 outputs a timing signal to each of the LED light source 32 and the distance image sensor 38 under the control of the control unit 26.

The LED light source 32 emits pulsed light with a constant pulse width in synchronization with the timing signal input from the timing generator 31. The light source driver 33 controls the driving of the LED light source 32 under the control of the control unit 26.

The projection lens 35 emits the pulsed light from the LED light source 32 to the body 2 to be projected. In a case in which the body 2 to be projected is irradiated with the pulsed light emitted from the LED light source 32 through the projection lens 35, the focus lens 36 focuses pulsed light reflected from the body 2 to be projected on the distance image sensor 38. The lens driver 37 controls, for example, the focus of the focus lens 36 through a lens driving unit (not illustrated).

The distance image sensor 38 includes a plurality of light receiving elements which are two-dimensionally arranged and includes a complementary metal-oxide semiconductor (CMOS) driver having, for example, a vertical driver and a horizontal driver and a CMOS image sensor that is driven by the timing generator 31. However, the distance image sensor 38 is not limited to the CMOS type and may be an XY-address-type image sensor or a charge coupled device (CCD) image sensor.

In the distance image sensor 38, a plurality of light receiving elements (photodiodes) are two-dimensionally arranged. A bandpass filter that transmits only the wavelength band of the pulsed light emitted from the LED light source 32 or a visible light cut filter that cuts visible light may be provided on the incident surface side of the plurality of light receiving elements. Therefore, the plurality of light receiving elements of the distance image sensor 38 function as pixels that are sensitive to pulsed light.

The exposure period (the exposure time and the exposure timing) of the distance image sensor 38 is controlled by the timing signal input from the timing generator 31 in synchronization with the emission of pulsed light from the LED light source 32. Charge corresponding to the amount of pulsed light incident for the exposure period is accumulated in each light receiving element of the distance image sensor 38. As such, in the pulsed light detection method, as the distance to the body 2 to be projected is reduced, the amount of exposure increases. On the contrary, as the distance to the body 2 to be projected increases, the amount of exposure is reduced. Therefore, it is possible to measure the distance to the body 2 to be projected according to the amount of exposure. A pixel signal (an analog signal corresponding to the charge accumulated in each pixel) corresponding to the amount of incident pulsed light reflected from the body 2 to be projected is read out from the distance image sensor 38.

The AD converter 39 converts the pixel signal read out from the distance image sensor 38 into a digital signal and outputs the digital signal to the interface circuit 40. In some cases, the CMOS image sensor includes the AD converter 39. In this case, the AD converter 39 can be omitted. The interface circuit 40 functions as an image input controller and outputs the digital signal input from the AD converter 39 to the control unit 26. Then, a distance image generation unit 113 (FIG. 6) of the control unit 26 generates a distance image and the projection image generation unit 28 generates the projection image 5, which will be described in detail below.

The projector unit 20B is a so-called a single-panel liquid crystal projector and includes a display optical element (also referred to as a light modulation element) 42, an element driver 43, an LED light source (projection light source) 44, a light source driver 45, a projection lens 46, and a lens driver 47.

The display optical element 42 is, for example, a transmissive liquid crystal panel including color filters of a plurality of colors or an element with a color-filterless structure obtained by combining a dichroic mirror, a microlens array, and a transmissive monochrome liquid crystal panel. In the element with a color-filterless structure, for example, three types of dichroic mirrors that reflect red (R) light, green (G) light, and blue (B) light disperse white light into three RGB light components such that the three color light components are incident on the microlens array on the liquid crystal panel at different angles. Then, the three color light components are incident on an R pixel, a G pixel, and a B pixel of the liquid crystal panel by the microlens array. In this way, it is possible to display a color image.

The projector unit 20B is not limited to the single-panel liquid crystal projector and may be a known three-panel liquid crystal projector including a color separation optical system and a plurality of liquid crystal panels. In addition, the projector unit 20B is not limited to the transmissive liquid crystal type and may be various other types, such as a reflective liquid crystal display type or a micromirror device type (light switch display type).

The element driver 43 controls the display optical element 42 under the control of the control unit 26 such that the projection image 5 generated by the projection image generation unit 28 which will be described below is displayed.

The LED light source 44 emits white light so as to be incident on the display optical element 42 from the rear side (a side opposite to the projection lens 46) of the display optical element 42. Then, the image light of the projection image 5 is emitted from the display optical element 42. The light source driver 45 controls the driving of the LED light source 44 under the control of the control unit 26.

The projection lens 46 projects the image light of the projection image 5 emitted from the display optical element 42 to the body 2 to be projected. The lens driver 47 controls, for example, the focus of the projection lens 46 through a lens driving unit (not illustrated).

The control unit 26 is connected to, for example, the timing generator 31, the light source driver 33, the lens driver 37, the distance image sensor 38, the interface circuit 40, the element driver 43, the light source driver 45, and the lens driver 47 through a data bus 49. The control unit 26 includes, for example, various arithmetic units and processing units including a central processing unit (CPU) and a storage unit and executes a control program or data read out from the memory 27 to generally control the overall operation or process of the projector apparatus 20.

The memory 27 stores, for example, a control program used by the control unit 26 to perform processes.

The projection image generation unit 28 generates the projection image 5 on the basis of data or information input from the control unit 26 under the control of the control unit 26. That is, the projection image generation unit 28 detects the shape of the body 2 to be projected, on the basis of the distance image acquired by the distance image acquisition device, and generates the projection image 5 corresponding to the detected shape. The generation of the projection image 5 by the projection image generation unit 28 will be described below.

Basic Principle of TOF Method

Next, the basic principle of the acquisition of a distance image by a TOF camera will be described. Hereinafter, a case in which the distance image of the body 2 to be projected is acquired by the TOF camera (distance image acquisition unit 20A) will be described.

The LED light source 32 of the distance image acquisition unit 20A emits near-infrared light. Therefore, the LED light source 32 is pulse-driven by the timing generator 31. As a result, pulsed light with a pulse width is emitted from the LED light source 32. The pulsed light is reflected from the surface of the body 2 to be projected. The reflected pulsed light is focused (received) by the distance image sensor 38 through the focus lens 36 of the distance image acquisition unit 20A. In addition, a visible light cut filter is provided in the distance image sensor 38 and the distance image sensor 38 receives only pulsed near-infrared light.

FIG. 5 is a diagram illustrating a process of calculating the distance to the body 2 to be projected.

The LED light source 32 of the distance image acquisition unit 20A is pulse-driven by the timing generator 31. As illustrated in FIGS. 5A and 5B, the timing generator 31 sequentially performs two exposure control processes, that is, first exposure control and second exposure control for the distance image sensor 38 in synchronization with the pulse driving of the LED light source 32.

In the first exposure control illustrated in FIG. 5A, pulsed light is emitted from the LED light source 32 and the exposure period is controlled such that the amount of exposure of the corresponding light receiving element in the distance image sensor 38 varies depending on at least the distance to the body 2 to be projected. After a predetermined period of time (the time until pulsed light returns from the farthest object whose distance can be measured) has elapsed since the pulsed light has been emitted from the LED light source 32, exposure starts. After the time (predetermined exposure time) required for all of pulsed light reflected from at least the farthest object to return has elapsed, the exposure ends.

In the second exposure control illustrated in FIG. 5B, pulsed light is emitted from the LED light source 32 and the phase of the start of exposure to pulsed light is different from the phase of the start of exposure to pulsed light in the first exposure control. The second exposure control is performed in order to remove a difference in the reflectivity of an object and a change in the amount of exposure in the distance image sensor 38 by pulsed light of which the amount is not uniform on the entire screen. In this example, in the second exposure control, all of the light receiving elements of the distance image sensor 38 are exposed to all of the pulsed light reflected from the object. Specifically, exposure starts in synchronization with the emission time of pulsed light from the LED light source 32. The exposure ends after a predetermined period of time (a predetermined exposure time until all of the pulsed light returns from at least the farthest object whose distance can be measured) has elapsed. The "predetermined exposure time" in the first exposure control and the "predetermined exposure time" in the second exposure control are equal to each other. However, as described above, the phase of the start of exposure to pulsed light in the first exposure control is different from the phase of the start of exposure to pulsed light in the second exposure control.

Then, in a case in which sensor outputs (output data of a certain pixel) corresponding to each amount of exposure acquired from the distance image sensor 38 by the first exposure control and the second exposure control are first data $L_1$ and second data $L_2$ as illustrated in FIG. 5C, the distance image generation unit 113 of the control unit 26 calculates distance information D corresponding to the distance of the object using the following expression:

$$D = L_1 \div L_2. \qquad \text{[Expression 1]}$$

That is, division data obtained by dividing the first data $L_1$ by the second data $L_2$ is calculated by [Expression 1]. The division data is data (distance information D) corresponding to a relative distance from which the influence of the reflectivity of the object and the influence of the amount of pulsed light that is not uniform on the entire screen have been removed. However, the absolute distance to the object may be calculated on the basis of the first data $L_1$ and the second data $L_2$.

Then, the distance information D of all of the pixels of the distance image sensor 38 is acquired to generate a three-dimensional distance image.

Generation of Projection Image

Next, the generation of the projection image 5 by the projection image generation unit 28 will be described.

The projection image generation unit 28 performs, for example, a trimming process, a coordinate transformation process, and an enlargement and reduction process for an image for projection (a motion picture or a still image) recorded in the memory 27, using a first distance image and a second distance image (that is, information, such as the shape, size, and irregularity of the projection region 3 of the body 2 to be projected) generated by the distance image generation unit 113 (FIG. 6), to generate the projection image 5 corresponding to the surface of the body 2 to be projected. In addition, it is preferable that a distance image used by a difference value acquisition unit 101 is used as the distance image used by the projection image generation unit 28 to generate the projection image 5 in order to effectively use data.

In the display optical element 42 of the projector unit 20B illustrated in FIG. 4, the transmittance of each optical element is controlled on the basis of the projection image 5 generated by the projection image generation unit 28.

First Embodiment

Next, a control unit 26 according to a first embodiment of the invention will be described.

Figure 6:
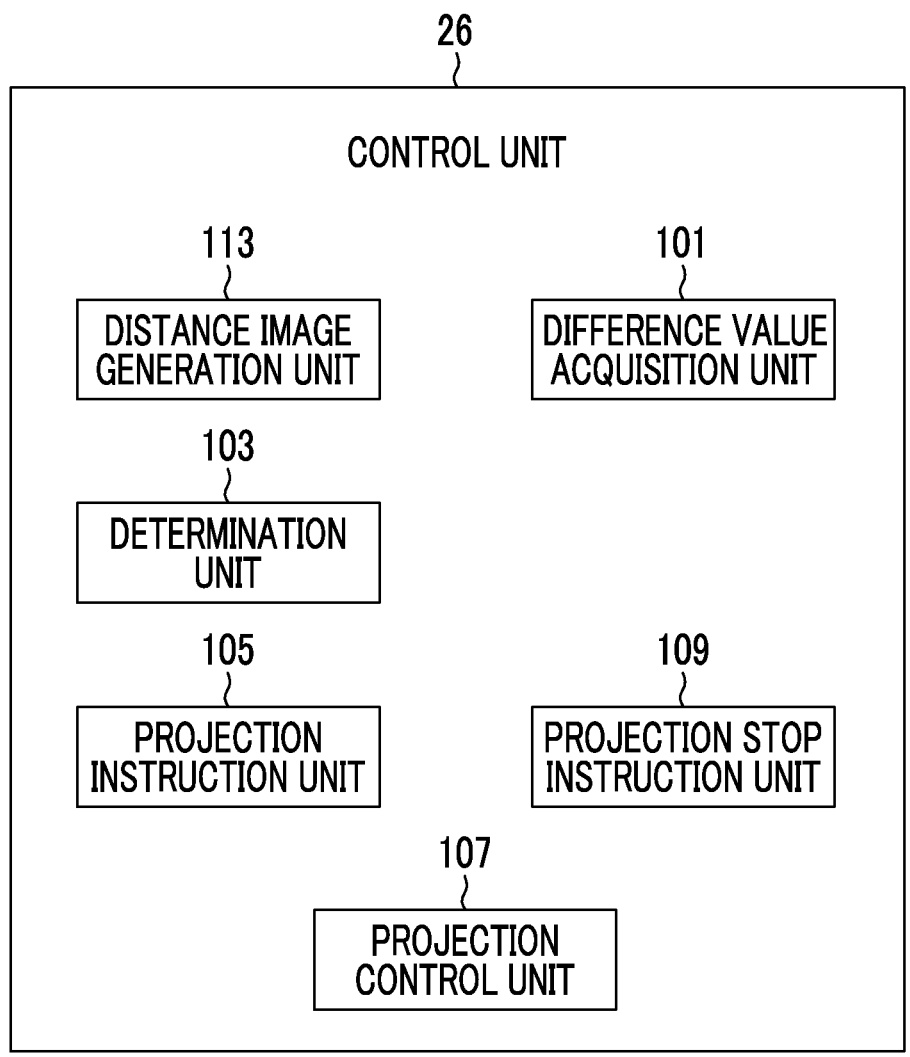
FIG. 6 is a block diagram illustrating the configuration of a control unit.

FIG. 6 is a block diagram illustrating the configuration of the control unit 26. The control unit 26 mainly includes the distance image generation unit 113, a difference value acquisition unit 101, a determination unit 103, a projection instruction unit 105, a projection control unit 107, and a projection stop instruction unit 109.

The distance image generation unit 113 acquires distance information from the distance image sensor 38 and generates a distance image on the basis of the acquired distance information. Here, the distance information is information corresponding to the time of flight of measurement light that is reflected light of the pulsed light (measurement light), which has been emitted from the LED light source 32 and then reflected from the body 2 to be projected, and is incident on the distance image sensor 38. The distance information corresponds to the distance to the body 2 to be projected. A detailed distance image generation method of the distance image generation unit 113 is as described above. The distance image generated by the distance image generation unit 113 is formed by distance information that is two-dimensionally distributed.

The difference value acquisition unit 101 acquires a difference value between distance information of the first distance image acquired by the distance image acquisition unit 20A at a first timing and distance information of the second distance image acquired by the distance image acquisition unit 20A at a second timing.

Figure 7A:
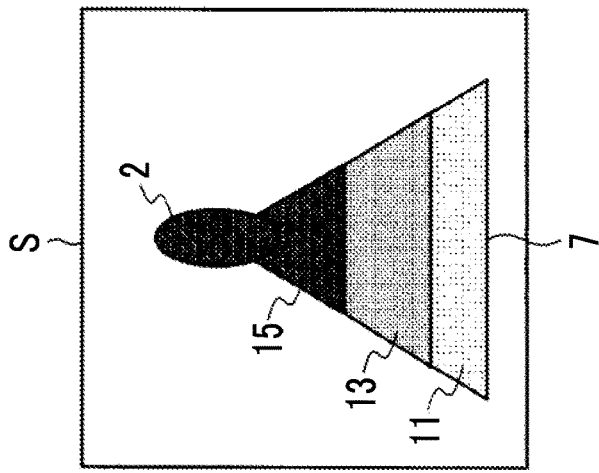
FIG. 7A to FIG. 7C are diagrams illustrating the acquisition of a difference value by a difference value acquisition unit.
Figure 7B:
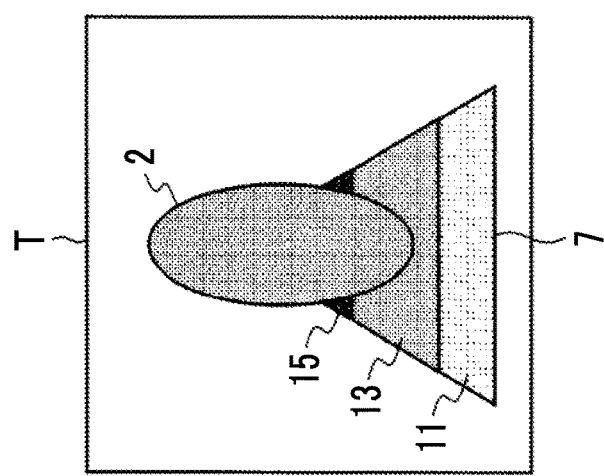

FIGS. 7 and 8 are diagrams illustrating the acquisition of the difference value by the difference value acquisition unit 101. FIG. 7A illustrates a distance image S acquired by the distance image acquisition unit 20A in the case of FIG. 2A (time T1). FIG. 7B illustrates a distance image T acquired by the distance image acquisition unit 20A in the case of FIG. 2B (time T2). For convenience of explanation, the distance information is displayed as a short distance 11, a middle distance 13, and a long distance 15 with different densities. In FIG. 7, the body 2 to be projected is drawn in an elliptical shape and is simplified and the background except a stage 7 and the body 2 to be projected is omitted.

In the distance image S illustrated in FIG. 7A, the stage 7 has the distance information of the short distance 11, the middle distance 13, and the long distance 15 and the body 2 to be projected has the distance information of the long distance 15. In the distance image S, the density of a region having the distance information of the long distance 15 in the stage 7 is equal to the density of the body 2 to be projected. In the distance image T illustrated in FIG. 7B, the stage 7 has the distance information of the short distance 11, the middle distance 13, and the long distance 15 and the body 2 to be projected has the distance information of the middle distance 13. In the distance image T, the density of a region having the distance information of the middle distance 13 in the stage 7 is equal to the density of the body 2 to be projected.

Figure 7C:
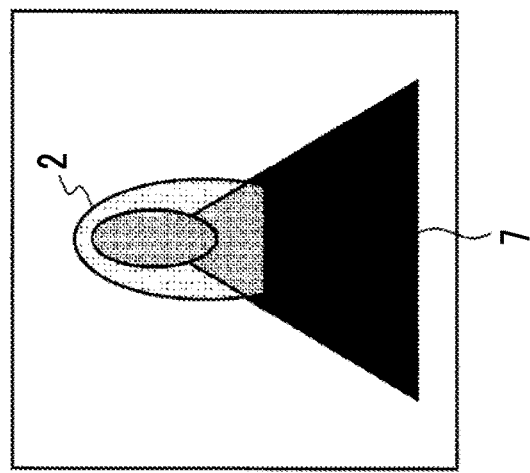

FIG. 7C illustrates the difference value between the distance information of the distance image S and the distance information of the distance image T. Since the distance information related to the stage 7 is the same in the distance image S and the distance image T, the difference value is 0. In contrast, since the distance information related to the body 2 to be projected is different in the distance image S and the distance image T, the difference value is not 0. That is, while the distance information of the body 2 to be projected in the distance image S is the long distance 15, the distance information of the body 2 to be projected in the distance image T is the middle distance 13. Therefore, the difference value of the body 2 to be projected is generated.

Figure 8A:
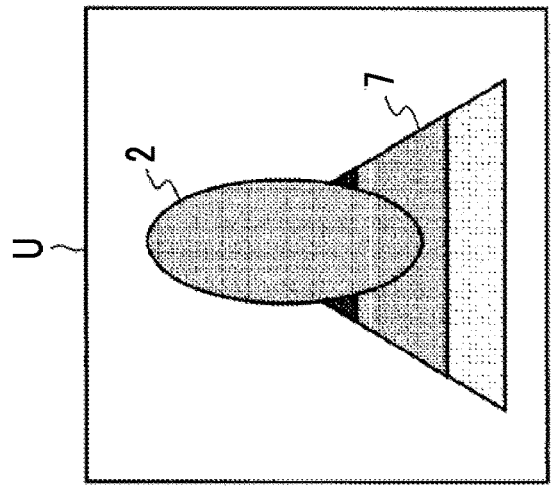
FIG. 8A to FIG. 8C are diagrams illustrating the acquisition of a difference value by a difference value acquisition unit.
Figure 8B:
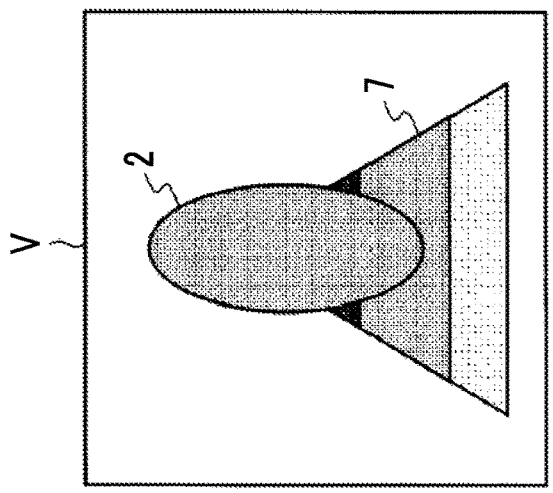
Figure 8C:
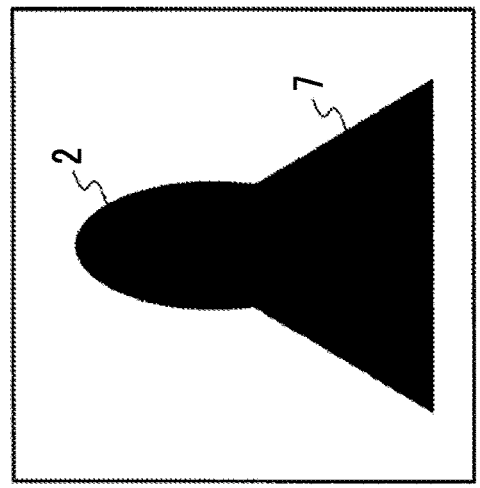

FIG. 8 illustrates distance images U and V that are acquired in a case in which the body 2 to be projected is at a standstill. That is, FIG. 8A illustrates the distance image U acquired by the distance image acquisition unit 20A at a time T3 and FIG. 8B illustrates the distance image V acquired by the distance image acquisition unit 20A at a time T4. In the distance images U and V, the body 2 to be projected has the same distance information of the middle distance 13. Therefore, as illustrated in FIG. 8C, the difference value between the distance information of the distance image U and the distance information of the distance image V is 0. The difference value of the stage 7 is 0 as in FIG. 7. A time difference between the time T3 and the time T4 is very small. Therefore, in a case in which the difference value between the distance information items of the distance images U and V is close to 0, it is supposed that the body 2 to be projected is at a standstill. In addition, the distance image acquisition unit 20A can continuously acquire the distance image. In this case, the distance image acquisition unit 20A can acquire the distance image at 30 frames per second (fps) or 60 fps.

As such, the difference value acquisition unit 101 acquires the difference value, using the subtraction between the distance information of the distance image acquired at the first timing and the distance information of the distance image acquired at the second timing.

In addition, the difference value acquisition unit 101 may acquire the average value of the distance information of the distance image S, acquire the average value of the distance information of the distance image T, and use a value obtained by the subtraction between the average values as the difference value. That is, the difference value acquisition unit 101 may acquire, as the difference value, a value obtained by the subtraction between the average value of the distance information of the distance image acquired at the first timing and the average value of the distance information of the distance image acquired at the second timing.

For example, the difference value acquisition unit 101 may acquire, as the difference value, the maximum difference between the distance information of the distance image acquired at the first timing and the distance information of the distance image acquired at the second timing. That is, the difference value acquisition unit 101 may use, as the difference value, the maximum value of the difference between the distance information of the distance image acquired at the first timing and the distance information of the distance image acquired at the second timing.

For example, the difference value acquisition unit 101 may acquire, as the difference value, a value obtained by the subtraction between the sum of the distance information of the distance image acquired at the first timing and the sum of the distance information of the distance image acquired at the second timing.

Returning to FIG. 6, the determination unit 103 determines whether the body 2 to be projected is at a standstill on the basis of the difference value acquired by the difference value acquisition unit 101. That is, the determination unit 103 acquires the difference value and determines the state of the body 2 to be projected (whether the body 2 to be projected is moving or is at a standstill) on the basis of the difference value. The determination unit 103 can determine the state of the body 2 to be projected on the basis of the difference value, using various methods. For example, the determination unit 103 can determine the state of the body 2 to be projected on the basis of a threshold value. Specifically, in a case in which the acquired difference value is equal to or less than a threshold value, the determination unit 103 may determine that the body 2 to be projected is at a standstill. In a case in which the acquired difference value is greater than the threshold value, the determination unit 103 may determine that the body 2 to be projected is moving. For the threshold value, a threshold value (first threshold value) in a case in which the determination unit 103 performs the determination on the basis of the difference value between the average value of the distance information of the first distance image and the average value of the distance information of the second distance image is different from a threshold value (second threshold value) in a case in which the determination unit 103 performs the determination on the basis of the maximum difference value between the distance information of the first distance image and the distance information of the second distance image.

The projection instruction unit 105 outputs a command to project the image generated by the projection image generation unit 28 to the body 2 to be projected, on the basis of the determination result of the determination unit 103. That is, in a case in which the determination unit 103 determines that the body 2 to be projected is at a standstill, the projection instruction unit 105 outputs a command to perform projection to the projector unit 20B.

The projection control unit 107 controls the projection operation of the projector unit 20B on the basis of the projection command output from the projection instruction unit 105. The projection control unit 107 performs control such that the projection image 5 generated by the projection image generation unit 28 is displayed on the display optical element 42, the light source driver 45 directs the LED light source 44 to emit light, and the projection image 5 is displayed on the body 2 to be projected.

After the body 2 to be projected is determined to be at a standstill and the projector unit 20B starts to perform projection, in a case in which the determination unit 103 determines that the body 2 to be projected is moving, the projection stop instruction unit 109 outputs a stop command to stop the projection of the image generated by the projection image generation unit 28 to the body 2 to be projected. That is, in a case in which the body 2 to be projected moves again, the projection stop instruction unit 109 outputs a command to stop the projection operation of the projector unit 20B. In addition, during the projection operation of the projector unit 20B, the distance image acquisition unit 20A acquires the distance image at any time and the determination unit 103 determines the state of the body 2 to be projected at any time.

Next, a projection method using the projector apparatus 20 will be described. FIG. 9 is a flowchart illustrating the operation of the projector apparatus 20.

First, the distance image acquisition unit 20A of the projector apparatus 20 acquires a distance image at the first timing (Step S10). Then, the distance image acquisition unit 20A acquires a distance image at the second timing (Step S11). Then, the difference value acquisition unit 101 acquires a difference value between the distance information of the distance image acquired at the first timing and the distance information of the distance image acquired at the second timing (Step S12). The acquisition of the distance image by the distance image acquisition unit 20A and the acquisition of the difference value by the difference value acquisition unit 101 are performed at any time, which is not illustrated in the drawings.

Then, the determination unit 103 determines whether the body 2 to be projected is at a standstill on the basis of the difference value (Step S13). In a case in which the determination unit 103 determines that the body 2 to be projected is not at a standstill (is moving) (No in Step S13), the distance image acquisition unit 20A acquires a distance image again. On the other hand, in a case in which the determination unit 103 determines that the body 2 to be projected is at a standstill, the projection image generation unit 28 generates the projection image 5 (Step S14). The projection image generation unit 28 generates the projection image 5 on the basis of the distance image acquired at the first timing and/or the distance image acquired at the second timing. Then, the projection instruction unit 105 outputs a command to project the projection image 5 (Step S15). Then, the projection control unit 107 controls the projector unit 20B such that the projection image is projected to the body 2 to be projected (Step S16).

Each of the above-mentioned configurations and functions can be appropriately implemented by arbitrary hardware, arbitrary software, or a combination thereof. For example, the invention can also be applied to a program that causes a computer to perform the above-mentioned processing steps (processing procedures), a computer-readable recording medium (non-transitory recording medium) that stores the program, or a computer in which the program can be installed.

As described above, according to the invention, the shape of the body 2 to be projected is detected on the basis of the distance image generated by the distance image generation unit 113 of the distance image acquisition unit 20A and the projection image 5 is generated. In addition, according to the invention, it is determined whether the body 2 to be projected is at a standstill on the basis of the difference value between the distance image acquired at the first timing and the distance image acquired at the second timing and projection is performed on the basis of the determination result. Therefore, in the invention, the distance image is used to generate the projection image 5 and is used to determine whether an object is at a standstill. As a result, it is possible to detect the movement of the body 2 to be projected while preventing an increase in the size of an apparatus and preventing the apparatus from being complicated and to project the projection image 5 to the body 2 to be projected with high accuracy.

Second Embodiment

Next, a second embodiment of the invention will be described. In this embodiment, a difference image is generated on the basis of a difference value and the movement of the body 2 to be projected is detected with high accuracy.

FIG. 10 is a block diagram illustrating the configuration of a control unit 26 according to this embodiment. The same components as those illustrated in FIG. 6 are denoted by the same reference numerals and the description thereof will not be repeated. The control unit 26 mainly includes a distance image generation unit 113, a difference value acquisition unit 101, a determination unit 103, a difference image generation unit 111, a projection instruction unit 105, a projection control unit 107, and a projection stop instruction unit 109.

The control unit 26 according to this embodiment illustrated in FIG. 10 differs from the control unit 26 according to the first embodiment illustrated in FIG. 6 in that the control unit 26 according to this embodiment includes the difference image generation unit 111.

The difference image generation unit 111 generates a difference image on the basis of the difference value acquired by the difference value acquisition unit 101. That is, the difference image generation unit 111 creates a two-dimensional distribution chart of the difference value on the basis of the difference value acquired from the difference value acquisition unit 101. Here, the difference image is the two-dimensional distribution chart of the difference value.

FIG. 11 is a conceptual diagram illustrating a difference image. A difference image W illustrated in FIG. 11 is created on the basis of the distance image and the difference value illustrated in FIGS. 7 and 8. In addition, the difference image may be displayed such that density or a color varies depending on the difference value forming the difference image. In this case, in a case in which the difference image is displayed on a display screen (not illustrated), the user easily recognizes a difference in the difference value. In the case of the difference image illustrated in the FIG. 11, a difference in the difference value is expressed. The background except the body 2 to be projected and the stage 7 is omitted.

Figure 11A:
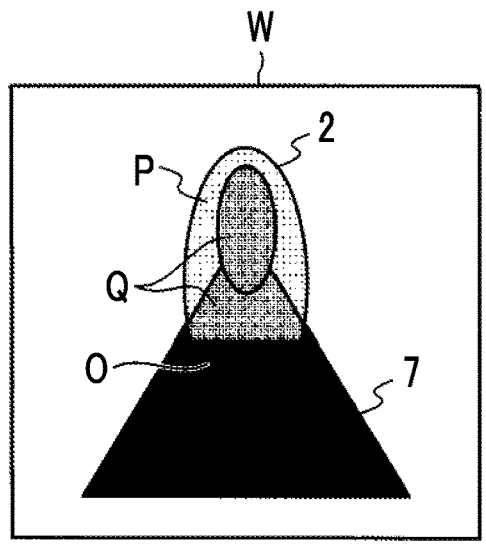
FIG. 11A to FIG. 11B are conceptual diagrams illustrating a difference image.

FIG. 11A illustrates a difference image W that is created on the basis of the difference value acquired from the distance images S and T illustrated in FIGS. 7A and 7B and illustrates the two-dimensional distribution of the acquired difference value. Since the difference value of the stage 7 between the distance images S and T is 0, the stage 7 is represented in black. In contrast, the body 2 to be projected includes three regions (regions O, P, and Q) with different difference values between the distance images S and T.

Since the difference value of the region O between the distance images S and T is 0, the region O is displayed in black, similarly to the stage 7. The difference value of the region Q is a difference value between the middle distance 13 (FIG. 7) and the long distance 15 (FIG. 7) and the difference value of the region P is a difference value between the middle distance 13 (FIG. 7) and the background. It is assumed that the background is infinite.

Figure 11B:
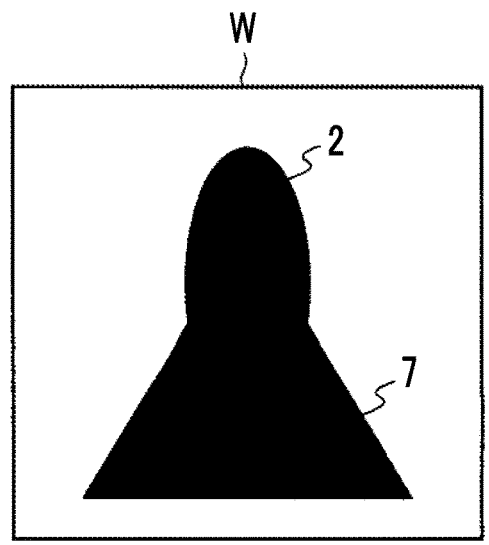

FIG. 11B illustrates the difference image W that is created on the basis of the difference value acquired from the distance images U and V illustrated in FIGS. 8A and 8B and illustrates the two-dimensional distribution of the acquired difference value. In the case illustrated in FIG. 11B, since the difference values of the body 2 to be projected and the stage 7 are 0, the body 2 to be projected and the stage 7 are represented in black. As such, the difference image is formed by the two-dimensional distribution of the difference value between the distance information items of the distance images.

Returning to FIG. 10, the determination unit 103 according to this embodiment can determine the movement of the body 2 to be projected in various aspects on the basis of the difference image W. For example, the determination unit 103 can determine whether the body 2 to be projected is at a standstill, on the basis of a value obtained by multiplying a weighting coefficient which is set according to the region of the difference image by the difference value, using a threshold value (seventh threshold value). In this case, the difference image generation unit 111 acquires the value obtained by multiplying the weighting coefficient which is set according to the region of the difference image by the difference value.

Figure 12:
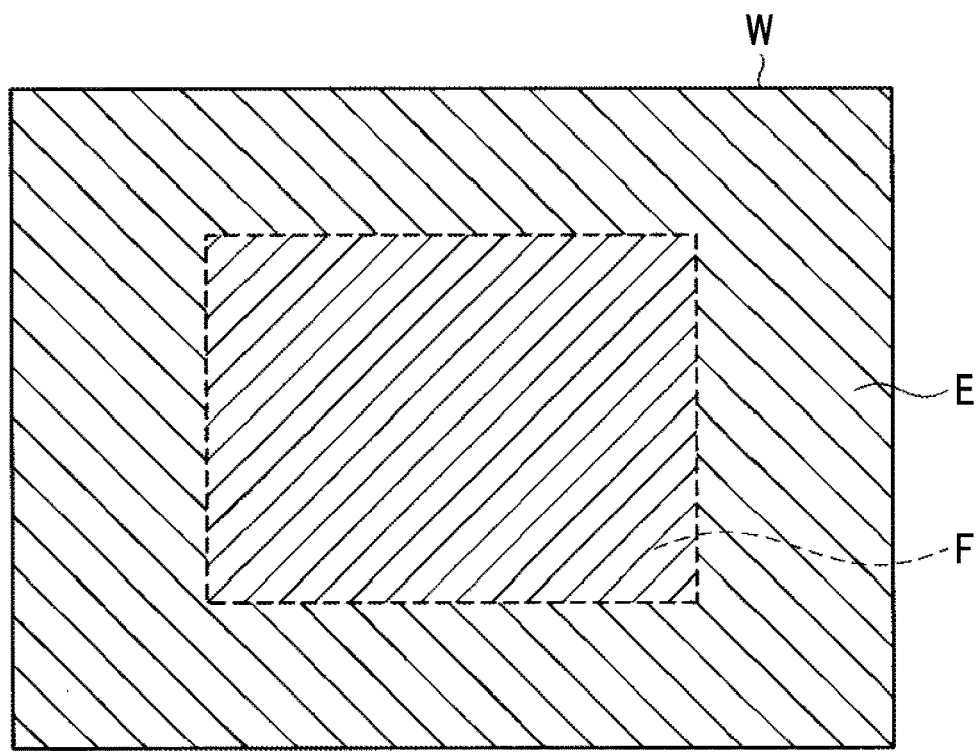
FIG. 12 is a conceptual diagram illustrating the difference image.

FIG. 12 is a conceptual diagram illustrating the difference image W. In the difference image W illustrated in FIG. 12, different weighting coefficients are set to a region F and a region E and the difference image generation unit 111 acquires a value obtained by multiplying the weighting coefficient by the difference value. For example, a weighting coefficient for the region E is 1.5 and a weighting coefficient for the region F is 0.5. Then, the difference image generation unit 111 multiplies the weighting coefficient for the region F by the difference value of the region F and multiplies the weighting coefficient for the region E by the difference value of the region E. In many cases, a main object is located at the center of the image. The above-mentioned configuration makes it possible to accurately detect the movement of the main object (body 2 to be projected). In FIG. 12, the image is divided into a region in the vicinity of the center and a peripheral region. However, the regions can be set in various aspects. For example, the difference image W may be divided into N×M (N and M are integers) grid-shaped regions and the regions may be divided along the shape of the body 2 to be projected.

Figure 13A:
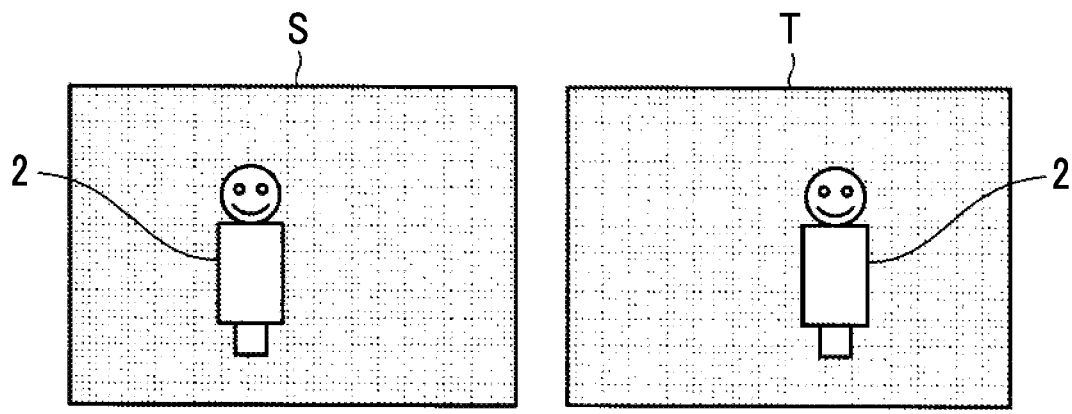
FIG. 13A to FIG. 13B are conceptual diagrams illustrating distance images and a difference image.

FIGS. 13 and 14 are conceptual diagrams illustrating the distance images S and T and the difference image W. FIG. 13A illustrates the distance image S and the distance image T in which the body 2 to be projected moves to the vicinity of the center. The distance image S is captured at the time T1, the distance image T is captured at the time T2, and the body 2 to be projected moves to the right in FIG. 13 for the period from the time T1 to the time T2. In FIG. 13A, the body 2 to be projected and the background are binarized with respect to the distance and the body 2 to be projected that is close to the projector apparatus 20 is represented in white, as compared to the background.

Figure 13B:
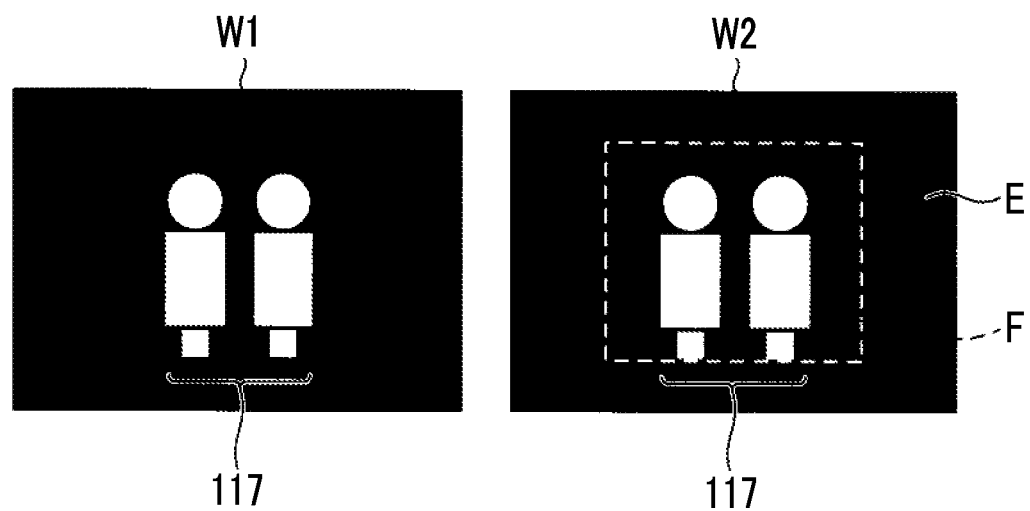

FIG. 13B illustrates the difference image (W1 and W2) between the distance image S and the distance image T illustrated in FIG. 13A. In FIG. 13B, a region with a difference value of 0 is represented in black and a region 117 with a difference value that is not 0 is represented in white. For example, it is assumed that the difference value of the region 117 in the difference image (W1 and W2) is 100. In the difference image W2, as illustrated in FIG. 12, weights are set to the regions E and F. In the difference image W1, no weights are set. In the difference image W2, since a weighting coefficient for the difference value of the region F is 1.5, the difference image generation unit 111 obtains a value of 150 that is the product of the difference value (100) of the region 117 and the weighting coefficient (1.5) (100× 1.5=150). In contrast, since no weights are set in the difference image W1, the difference value of W1 is 100.

Figure 14A:
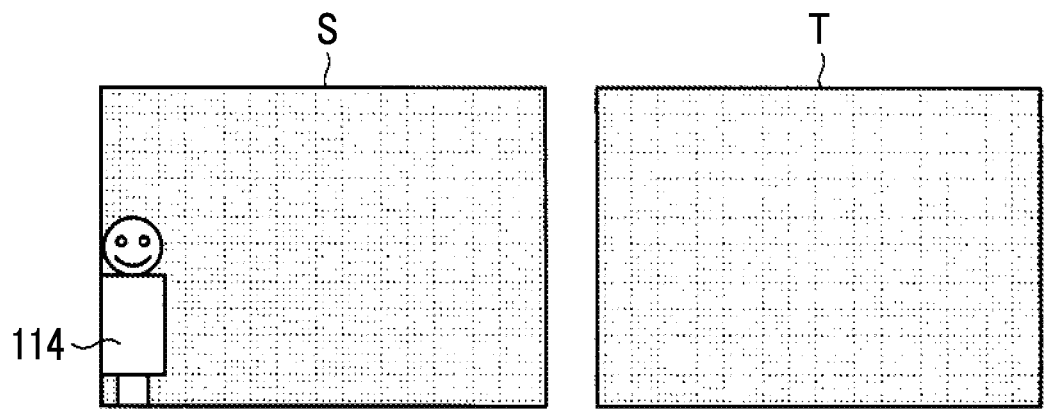
FIG. 14A to FIG. 14B are conceptual diagrams illustrating distance images and a difference image.

FIG. 14A illustrates a distance image S including a person 114 that is not the body 2 to be projected and a distance image T without including the person 114. The distance image S is captured at the time T1 and the distance image T is captured at the time T2. In FIG. 14A, the person 114 and the background are binarized with respect to the distance and the person 114 that is close to the projector apparatus 20 is represented in white, as compared to the background.

Figure 14B:
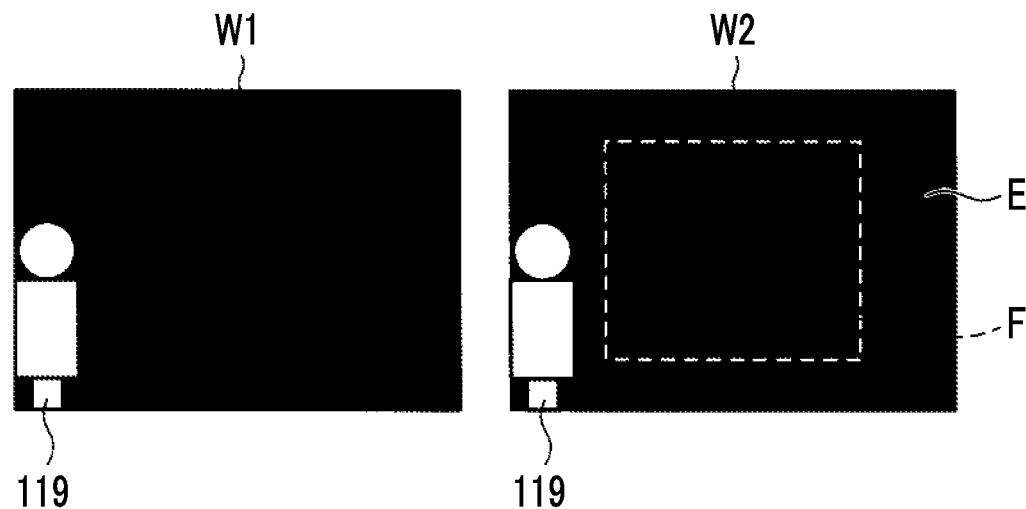

FIG. 14B illustrates a difference image (W1 and W2) between the distance image S and the distance image T illustrated in FIG. 14A. In the difference image, a region 119 which corresponds to the person 114 and has a difference value that is not 0 is represented in white. For example, it is assumed that the difference value in the difference image (W1 and W2) is 50. In FIG. 14B, weights are set as in FIG. 13B. In the difference image W2, a weighting coefficient for the difference value of the region E is 0.5. Therefore, the difference image generation unit 111 multiplies the difference value (50) of the region 119 by the weighting coefficient (0.5) to obtain a value of 25 (50×0.5=25). In contrast, in the difference image W1, no weights are set. Therefore, the difference value of W1 is 50.

As such, in the case of FIGS. 3B and 14B (in a case in which a weight is set according to the region), the difference value of the region F is evaluated to be large and the difference value of the region E is evaluated to be small.

As such, weighting is performed according to the region of the difference image and the movement of the body 2 to be projected is determined on the basis of the value obtained by multiplying the weighting coefficient by the difference value. Therefore, it is possible to accurately determine the movement of the body 2 to be projected.

In addition, in a case in which an average difference value in a plurality of frames of the difference images generated by the difference image generation unit 111 is equal to or less than a threshold value (third threshold value), the determination unit 103 may determine that the body 2 to be projected is at a standstill. That is, the difference image generation unit 111 acquires the average difference value in one difference image and generates the average value of the average difference values corresponding to a plurality of frames. The determination unit 103 determines whether the body 2 to be projected is at a standstill on the basis of the obtained average difference values of the difference images corresponding to the plurality of frames. With this configuration, since it is determined whether the body 2 to be projected is at a standstill on the basis of the average value of the difference images in a plurality of frames, it is possible to determine the movement of the body 2 to be projected with high accuracy.

In a case in which the maximum difference value in a plurality of frames of the difference images is equal to or less than a threshold value (fourth threshold value), the determination unit 103 can determine that the body 2 to be projected is at a standstill. That is, the difference image generation unit 111 acquires the maximum difference value in the difference images in a plurality of frames. The determination unit 103 determines whether the body 2 to be projected is at a standstill on the basis of the maximum difference value. With this configuration, since it is determined whether the body 2 to be projected is at a standstill on the basis of the maximum difference value, it is possible to determine the movement of the body 2 to be projected with high accuracy.

Furthermore, the determination unit 103 determines whether the body 2 to be projected is at a standstill on the basis of the size of a region in which the difference value is equal to or less than a threshold value (fifth threshold value) in the difference image. That is, the difference image generation unit 111 calculates a region in which the difference value is equal to or less than the threshold value in the difference image. In a case in which the size of the region is larger than a predetermined size, the determination unit 103 determines that the body 2 to be projected is at a standstill. In addition, the difference image generation unit 111 may calculate a region in which the difference value is equal to or less than a threshold value (sixth threshold value) in the difference images in a plurality of frames. In a case in which the size of the region is greater than a predetermined size, the determination unit 103 may determine that the body 2 to be projected is at a standstill.

The difference value acquisition unit 101 can acquire or calculate various values related to the difference image as a value (hereinafter, referred to as an evaluation value) that is used by the determination unit 103 to determine the movement of the body 2 to be projected. For example, the difference image generation unit 111 may use, as the evaluation value, the number of pixels with a difference value that is not 0 between the distance image S and the distance image T. In addition, the difference image generation unit 111 may use, as the evaluation value, the variance value or standard deviation of the difference value of the difference image.

The embodiments of the invention have been described above. However, the invention is not limited to the above-described embodiments and various modifications of the invention can be made without departing from the spirit of the invention.

EXPLANATION OF REFERENCES

2: body to be projected
7: stage
20: projector apparatus with distance image acquisition device
20A: distance image acquisition unit
20B: projector unit
26: control unit
27: memory
28: projection image generation unit
29: input I/F
31: timing generator
32: measurement light source
33: light source driver
35: projection lens
36: focus lens
37: lens driver
38: distance image sensor
39: AD converter
40: interface circuit
42: display optical element
43: element driver
44: projection light source
45: light source driver
46: projection lens
47: lens driver
49: data bus
101: difference value acquisition unit
103: determination unit
105: projection instruction unit
107: projection control unit
109: projection stop instruction unit
111: difference image generation unit
113: distance image generation unit

What is claimed is:

1. A projector apparatus with a distance image acquisition device comprising:
   a projector device including a display optical element that displays a projection image and a projection light source and a projection lens that project the projection image displayed on the display optical element to a body to be projected; and
   a distance image acquisition device including a distance image sensor in which a plurality of light receiving elements are two-dimensionally arranged, a measurement light source, a focus lens that focuses measurement light which is emitted from the measurement light source and is reflected from the body to be projected on the distance image sensor, and a distance image generation unit that acquires, from the distance image sensor, distance information corresponding to a time of flight of the measurement light which is emitted from the measurement light source, is reflected from the body to be projected, and is incident on the distance image sensor and generates a distance image on the basis of the acquired distance information, wherein the projector device includes:

a projection image generation unit that detects a shape of the body to be projected, on the basis of the distance image acquired by the distance image acquisition device, and generates the projection image corresponding to the detected shape;

a difference value acquisition unit that acquires a difference value between distance information of a first distance image which is acquired by the distance image acquisition device at a first timing and distance information of a second distance image which is acquired by the distance image acquisition device at a second timing;

a determination unit that determines whether the body to be projected is at a standstill on the basis of the difference value acquired by the difference value acquisition unit;

a projection instruction unit that outputs a command to project an image generated by the projection image generation unit to the body to be projected, on the basis of a determination result of the determination unit; and a projection control unit that controls a projection operation of the projector device on the basis of the projection command output from the projection instruction unit, wherein the difference value acquisition unit acquires a difference value between an average value of the distance information of the first distance image and an average value of the distance information of the second distance image, and in a case in which the difference value is equal to or less than a first threshold value, the determination unit determines that the body to be projected is at a standstill.

2. The projector apparatus with a distance image acquisition device according to claim 1, wherein the difference value acquisition unit acquires a maximum difference value between the distance information of the first distance image and the distance information of the second distance image, and in a case in which the maximum difference value is equal to or less than a second threshold value, the determination unit determines that the body to be projected is at a standstill.

3. The projector apparatus with a distance image acquisition device according to claim 1, further comprising:

a difference image generation unit that generates a difference image on the basis of the difference value acquired by the difference value acquisition unit.

4. The projector apparatus with a distance image acquisition device according to claim 3, wherein the difference image generation unit acquires an average difference value of a plurality of frames of the difference images, and in a case in which the average difference value of the plurality of frames of the difference images is equal to or less than a third threshold value, the determination unit determines that the body to be projected is at a standstill.

5. The projector apparatus with a distance image acquisition device according to claim 3, wherein the difference image generation unit acquires a maximum difference value of a plurality of frames of the difference images, and in a case in which the maximum difference value of the plurality of frames of the difference images is equal to or less than a fourth threshold value, the determination unit determines that the body to be projected is at a standstill.

6. The projector apparatus with a distance image acquisition device according to claim 3, wherein the difference image generation unit acquires a difference value of each region of the difference image, and the determination unit determines whether the body to be projected is at a standstill on the basis of a size of the region in which the difference value is equal to or less than a fifth threshold value in the difference image.

7. The projector apparatus with a distance image acquisition device according to claim 3, wherein the difference image generation unit acquires a difference value of each region of the difference images in a plurality of frames, and the determination unit determines whether the body to be projected is at a standstill on the basis of a size of a region in which the difference value is equal to or less than a sixth threshold value in the difference images in the plurality of frames.

8. The projector apparatus with a distance image acquisition device according to claim 3, wherein the difference image generation unit acquires a value obtained by multiplying a weighting coefficient which is set according to a region of the difference image by the difference value, and in a case in which the value obtained by multiplying the weighting coefficient by the difference value is equal to or less than a seventh threshold value, the determination unit determines that the body to be projected is at a standstill.

9. The projector apparatus with a distance image acquisition device according to claim 1, further comprising:

a projection stop instruction unit that outputs a stop command to stop the projection of the image generated by the projection image generation unit to the body to be projected, on the basis of the determination result of the determination unit, wherein the projection control unit controls the projection operation of the projector apparatus on the basis of the projection stop command from the projection stop instruction unit.

10. A projector apparatus with a distance image acquisition device comprising:

a projector device including a display optical element that displays a projection image and a projection light source and a projection lens that project the projection image displayed on the display optical element to a body to be projected; and a distance image acquisition device including a distance image sensor in which a plurality of light receiving elements are two-dimensionally arranged, a measurement light source, a focus lens that focuses measurement light which is emitted from the measurement light source and is reflected from the body to be projected on the distance image sensor, and a distance image generation unit that acquires, from the distance image sensor, distance information corresponding to a time of flight of the measurement light which is emitted from the measurement light source, is reflected from the body to be projected, and is incident on the distance image sensor and generates a distance image on the basis of the acquired distance information, wherein the projector device includes:

a projection image generation unit that detects a shape of the body to be projected, on the basis of the distance image acquired by the distance image acquisition device, and generates the projection image corresponding to the detected shape;

a difference value acquisition unit that acquires a difference value between distance information of a first distance image which is acquired by the distance image acquisition device at a first timing and distance information of a second distance image which is acquired by the distance image acquisition device at a second timing;

a determination unit that determines whether the body to be projected is at a standstill on the basis of the difference value acquired by the difference value acquisition unit;

a projection instruction unit that outputs a command to project an image generated by the projection image generation unit to the body to be projected, on the basis of a determination result of the determination unit; and a projection control unit that controls a projection operation of the projector device on the basis of the projection command output from the projection instruction unit, wherein the difference value acquisition unit acquires a maximum difference value between the distance information of the first distance image and the distance information of the second distance image, and in a case in which the maximum difference value is equal to or less than a second threshold value, the determination unit determines that the body to be projected is at a standstill.

11. The projector apparatus with a distance image acquisition device according to claim 10, further comprising:

a difference image generation unit that generates a difference image on the basis of the difference value acquired by the difference value acquisition unit.

12. The projector apparatus with a distance image acquisition device according to claim 11, wherein the difference image generation unit acquires an average difference value of a plurality of frames of the difference images, and in a case in which the average difference value of the plurality of frames of the difference images is equal to or less than a third threshold value, the determination unit determines that the body to be projected is at a standstill.

13. The projector apparatus with a distance image acquisition device according to claim 11, wherein the difference image generation unit acquires a maximum difference value of a plurality of frames of the difference images, and in a case in which the maximum difference value of the plurality of frames of the difference images is equal to or less than a fourth threshold value, the determination unit determines that the body to be projected is at a standstill.

14. The projector apparatus with a distance image acquisition device according to claim 11, wherein the difference image generation unit acquires a difference value of each region of the difference image, and the determination unit determines whether the body to be projected is at a standstill on the basis of a size of the region in which the difference value is equal to or less than a fifth threshold value in the difference image.

15. The projector apparatus with a distance image acquisition device according to claim 11, wherein the difference image generation unit acquires a difference value of each region of the difference images in a plurality of frames, and the determination unit determines whether the body to be projected is at a standstill on the basis of a size of a region in which the difference value is equal to or less than a sixth threshold value in the difference images in the plurality of frames.

16. The projector apparatus with a distance image acquisition device according to claim 11, wherein the difference image generation unit acquires a value obtained by multiplying a weighting coefficient which is set according to a region of the difference image by the difference value, and in a case in which the value obtained by multiplying the weighting coefficient by the difference value is equal to or less than a seventh threshold value, the determination unit determines that the body to be projected is at a standstill.

17. The projector apparatus with a distance image acquisition device according to claim 10, further comprising:

a projection stop instruction unit that outputs a stop command to stop the projection of the image generated by the projection image generation unit to the body to be projected, on the basis of the determination result of the determination unit, wherein the projection control unit controls the projection operation of the projector apparatus on the basis of the projection stop command from the projection stop instruction unit.

* * * * *